United States Patent
Koo

(10) Patent No.: US 9,784,193 B2
(45) Date of Patent: Oct. 10, 2017

(54) METHOD FOR PREVENTING ENGINE STALL

(71) Applicant: HYUNDAI MOTOR COMPANY, Seoul (KR)

(72) Inventor: Bon Chang Koo, Seongnam-si (KR)

(73) Assignee: HYUNDAI MOTOR COMPANY, Seoul (KR)

(*) Notice: Subject to any disclaimer, the term of this patent is extended or adjusted under 35 U.S.C. 154(b) by 0 days.

(21) Appl. No.: 15/178,236

(22) Filed: Jun. 9, 2016

(65) Prior Publication Data

US 2017/0167444 A1    Jun. 15, 2017

(30) Foreign Application Priority Data

Dec. 14, 2015    (KR) .................. 10-2015-0177908

(51) Int. Cl.
| | |
|---|---|
| *F02D 41/04* | (2006.01) |
| *F02D 19/06* | (2006.01) |
| *F02M 25/08* | (2006.01) |
| *F02D 41/00* | (2006.01) |

(52) U.S. Cl.
CPC ....... *F02D 19/0623* (2013.01); *F02D 41/004* (2013.01); *F02D 41/0042* (2013.01); *F02D 41/04* (2013.01); *F02M 25/0809* (2013.01)

(58) Field of Classification Search
CPC .... F02D 19/0623; F02D 41/04; F02D 41/004; F02D 41/0042; F02M 25/0809
USPC ............... 123/349, 516, 518–520, 198 D
See application file for complete search history.

(56) References Cited

U.S. PATENT DOCUMENTS 7,017,558 B2 * 3/2006 Osanai ............... F02M 25/0827
123/198 D

FOREIGN PATENT DOCUMENTS

| JP | 07-110702 A | 4/1995 |
|---|---|---|
| JP | 2005-016484 A | 1/2005 |
| JP | 2013-199874 A | 10/2013 |
| KR | 10-1998-0060476 A | 10/1998 |
| KR | 10-1999-0049018 A | 7/1999 |
| KR | 10-1999-0059782 A | 7/1999 |

OTHER PUBLICATIONS

Korean Office Action dated Mar. 14, 2017, issued in Korean patent application No. 10-2015-0177908.

* cited by examiner

*Primary Examiner* — Mahmoud Gimie
(74) *Attorney, Agent, or Firm* — McDermott Will & Emery LLP

(57) ABSTRACT

A method for preventing engine stall of a vehicle includes detecting, by a control portion, whether a purge control valve becomes short to ground or not, determining, by the control portion, how rich a fuel is that has flowed into the engine using an oxygen sensor when it is determined that the purge control valve becomes short to ground in the detecting step, and controlling, by the control portion, a target RPM of the engine to be increased when it is determined that the fuel is rich in the determining step.

4 Claims, 4 Drawing Sheets

METHOD FOR PREVENTING ENGINE STALL

CROSS REFERENCE TO RELATED APPLICATION

The present application claims the benefit of priority to Korean Patent Application No. 10-2015-0177908, filed on Dec. 14, 2015 with the Korean Intellectual Property Office, the entire contents of which is incorporated herein for all purposes by this reference.

TECHNICAL FIELD

The present disclosure relates to a method for preventing engine stall by a short circuit to ground of a purge control valve.

BACKGROUND

In recent years, emissions regulations for vehicles have been enforced based on the North American market.

Particularly, the North American, Europe and Korea markets have looked at evaporation gas generated from a fuel tank in a vehicle as a source of air pollution and have set evaporation gas regulation values to regulate evaporation gas emissions.

Consequently, devices for limiting emissions of the evaporation gas generated from the fuel tank are applied to gasoline vehicles.

FIG. 1 is a drawing showing a device for preventing evaporation gas emission of a gasoline vehicle.

Referring to FIG. 1, a canister stores evaporation gasses generated from a fuel tank.

A purge control valve (PCSV: Purge Control Solenoid Valve) is provided so that an opening degree thereof can be adjusted depending on a collection degree of evaporation fuel collected in the canister and engine conditions in order to supply the evaporation gas into an engine cylinder.

The purge control valve is opened or closed according to a control signal of ECU (Electric Control Unit). If a short to ground phenomenon has occurred, where a wire between the purge control valve and the ECU is attached to a ground or is internally attached to the ground due to failure of the purge control valve, the purge control valve can always be opened so that rich fuel in the canister can be supplied to the engine. If the rich fuel is supplied to the engine at a low engine RPM (revolutions per minute) state, there is a risk that an engine RPM drop phenomenon has occurred such that the engine stalls.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and the present disclosure is intended to propose to a method for preventing engine stall of a vehicle due to failure of a purge control valve by detecting the time that the short to ground of the purge control valve is occurred to adjust an engine RPM.

A method for preventing engine stall of a vehicle in order to achieve the aforementioned objects may include detecting, by a control portion, whether a purge control valve becomes short to ground or not; determining, by the control portion, how rich the fuel is that has flowed into an engine by using an oxygen sensor when it is determined that the purge control valve becomes short to ground in the detecting step; and controlling, by the control portion, a target RPM of the engine to be increased when it is determined that the fuel is rich in the determining step.

The detecting step may include and perform confirming whether the control portion transmits a driving signal to the purge control valve; comparing, by the control portion, a measurement voltage at the purge control valve with a predetermined set-up voltage when it is determined that the control portion does not transmit the driving signal to the purge control valve in the confirming step; and deciding, by the control portion, that the short to ground has occurred at the purge control valve when it is determined that the measurement voltage is less than the predetermined set-up voltage in the comparing step.

The method may feature that the control portion may implement the detecting step only when an engine driving time is longer than a predetermined set-up time before the detecting step.

The method may further include a step of setting, by the control portion, a present engine RPM as the target RPM when it is determined in the determining step that the fuel flowed into the engine is normal.

According to the method for preventing engine stall of a vehicle configured as described above, when the purge control valve is connected to a ground to be short to ground, it is able to prevent engine stall due to short to ground of the purge control valve by controlling an engine RPM to be increased depending on an air/fuel ratio.

Furthermore, when the air/fuel ratio is normal, the engine RPM is not controlled to be increased, thereby minimizing inconvenience due to a target RPM increase.

BRIEF DESCRIPTION OF THE DRAWINGS

The above and other objects, features and advantages of the present disclosure will be more clearly understood from the following detailed description taken in conjunction with the accompanying drawings, in which.

DETAILED DESCRIPTION

Hereinafter, a method for preventing engine stall of a vehicle according to an exemplary embodiment of the present disclosure will be described with reference to the accompanying drawings.

Figure 1:
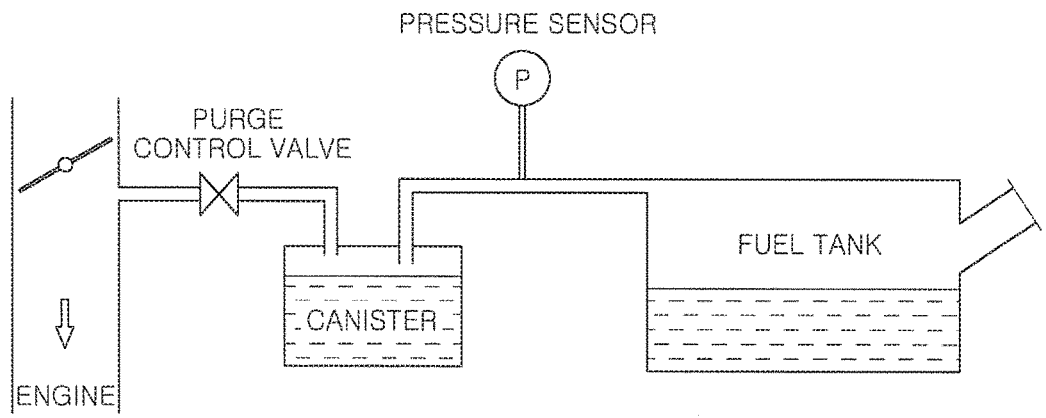
FIG. 1 is a drawing of a device for preventing evaporation gas emission of a gasoline vehicle.
Figure 2:
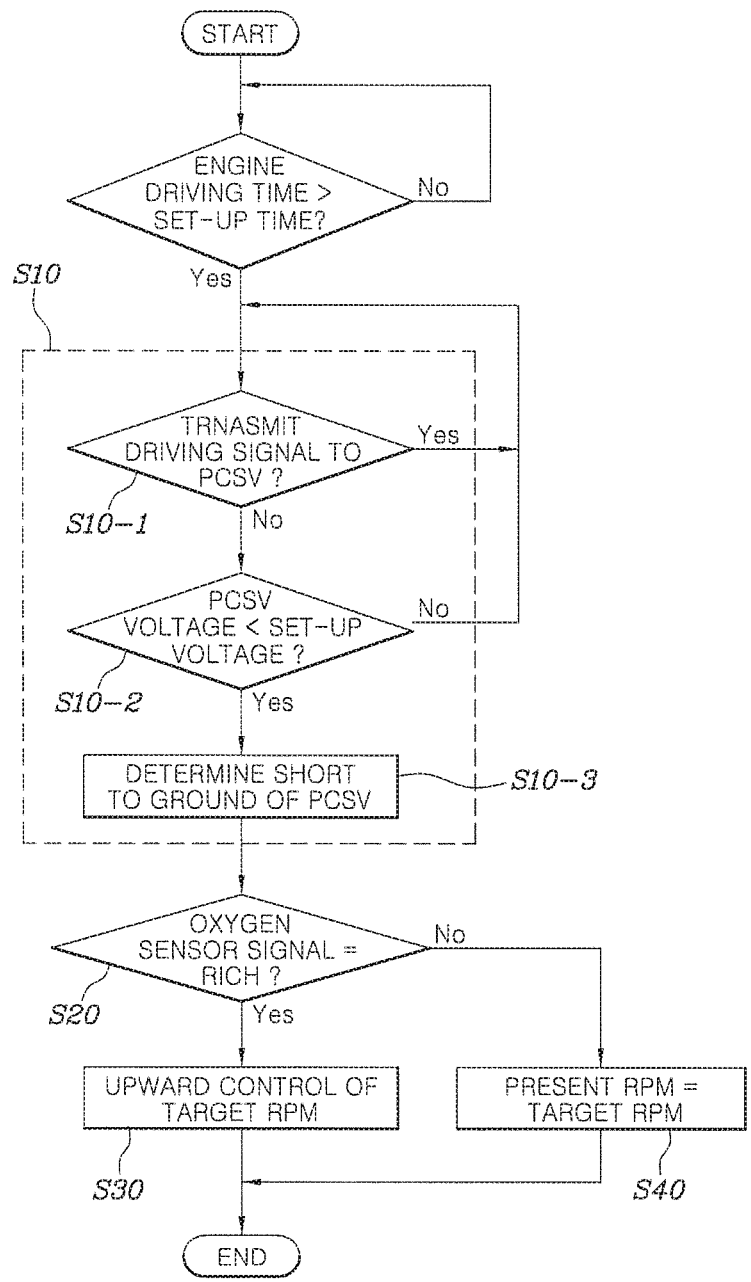
FIG. 2 is a flow chart representing a method for preventing engine stall of a vehicle according to an exemplary embodiment of the present disclosure.
Figure 3:
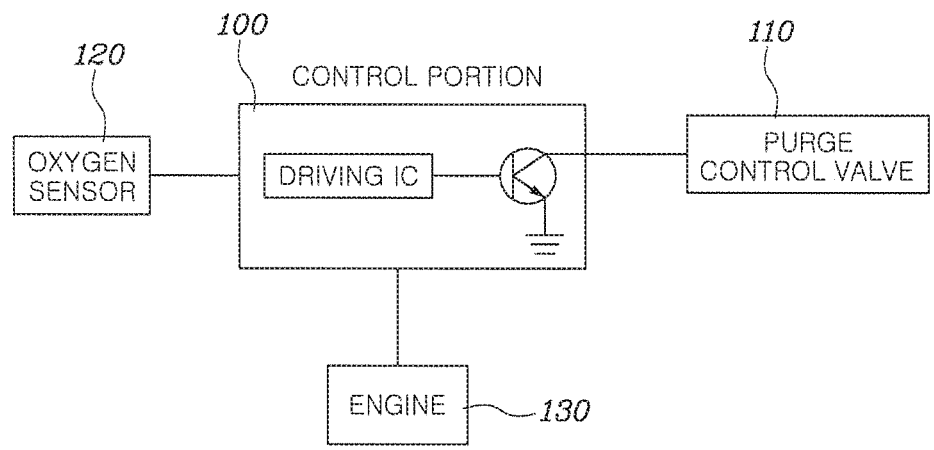
FIG. 3 is a schematic drawing showing a device for preventing engine stall of a vehicle according to an exemplary embodiment of the present disclosure.

FIG. 2 is a flow chart representing a method for preventing engine stall of a vehicle according to an embodiment of the present disclosure. FIG. 3 is a schematic drawing showing a device for preventing engine stall of a vehicle according to an embodiment of the present disclosure. Referring to FIG. 2 and FIG. 3, the method for preventing engine stall of a vehicle may include a step S10 of detecting, by a control portion 100, whether a purge control valve 110 becomes short to ground or not; a step S20 of determining, by the control portion 100, how rich the fuel is that has flowed into an engine 130 by using an oxygen sensor 120 when it is determined that the purge control valve 110 becomes short to ground in the detecting step S10; and a step S30 of controlling, by the control portion 100, a target RPM of the engine 130 to be increased when it is determined that the fuel is rich in the determining step S20.

As shown in FIG. 3, the control portion 100 may be connected to the purge control valve 110 via a switching element. The control portion 100 is provided to drive the purge control valve 110 by transmitting a driving signal to a switching element through an internal driving Integrated Circuit (IC).

In this regard, if the short to ground phenomenon occurs, that the wire between the purge control valve 110 and the control portion 100 is connected to a ground or it is internally connected to the ground due to failure of the purge control valve 110, the phenomenon that the purge control valve 110 operates to maintain its opened state even though the control portion 100 does not output the driving signal for driving the purge control valve 110, may occur.

As described above, if the purge control valve 110 becomes short to ground to maintain its opened state, since the rich fuel collected in a canister is supplied to the engine 130 so that the engine stall of a vehicle occurs by engine performance deterioration, it may be necessary to perform the step S10 of detecting, by the control portion 100, whether the purge control valve 110 becomes short to ground or not. In this regard, the short to ground may refer to the short phenomenon which occurs by which certain parts are connected with a ground.

The detecting step S10 may include and perform a step S10-1 of confirming whether the control portion 100 transmits a driving signal to the purge control valve 110; a step S10-2 of comparing, by the control portion 100, a measurement voltage at the purge control valve 110 with a predetermined set-up voltage when it is determined that the control portion 100 does not transmit the driving signal to the purge control valve 110 in the confirming step S10-1; and a step S10-3 of deciding, by the control portion 100, that the short to ground has occurred at the purge control valve 110 when it is determined that the measurement voltage is less than the predetermined set-up voltage in the comparing step S10-2.

That is, the control portion 100 first confirms whether the driving signal has been output internally S10-1. If the control portion 100 does not transmit the driving signal, the control portion 100 measures the voltage of the purge control valve 110 in order to confirm that the purge control valve 110 has operated.

In this regard, the control portion 100 is able to confirm whether the purge control valve 110 has operated or not by measuring the voltage at a rear end portion of a driving portion in the purge control valve 110 via a voltage sensor.

For example, if the purge control valve 110 is in a normal state in the situation where the control portion 100 does not output the driving signal, it may mean that the purge control valve 110 is not connected to the ground, so that the same voltage applied to the purge control valve 110 will be detected at the voltage sensor. However, if the short to ground where the purge control valve 110 is connected to the ground internally has occurred, current flows to the purge control valve 110 so that the purge control valve 110 operates, whereby the voltage remaining after driving the purge control valve 110 will be sensed at the voltage sensor.

Therefore, the control portion 100 may compare the measurement voltage at the purge control valve 110 with the predetermined set-up voltage in the situation of not outputting the driving signal S10-2, and may decide that the purge control valve 110 is connected to the ground internally when the measurement voltage is less than the predetermined set-up voltage S10-3. The control portion 100 may thus able to detect the short to ground phenomenon of the purge control valve 110 through the process described above.

When the control portion 100 detects the short to ground phenomenon of the purge control valve 110 through the detecting step S20, the control portion 100 may be able to determine the rich degree of the fuel that has flowed into the engine 130 using oxygen sensor 120.

In this regard, the oxygen sensor 120 may be provided at the side of the engine 130 to detect an oxygen concentration inside the fuel that has flowed into the engine 130. The control portion 100 may judge the fuel as being in the rich state when air is mixed with fuel to less than 0.5 based on lambda value $\lambda$ ($\lambda=1$ normal) through lambda signals received through the oxygen sensor 120.

When the purge control valve 110 becomes short to ground to maintain its opened state, the rich fuel inside of the canister may be supplied to the engine 130 so that the control portion 100 is able to determine, via the oxygen sensor, that the rich fuel is flowing into the engine 130.

If the rich fuel is supplied to the engine 130 as described above, a complete combustion is not achieved because fuel is richer than a normal state of the air/fuel ratio. Due to this, fuel may be fully filled into the engine cylinder so that a spark plug becomes wet and unable to cause a spark, and an engine revolution per minute (RPM) may drop.

Therefore, the control portion 100 in the controlling step S30 may control a target RPM to be increased in the face of engine RPM deterioration when it is determined that the fuel that has flowed into the engine 130 is rich in the determining step S20.

Figure 4:
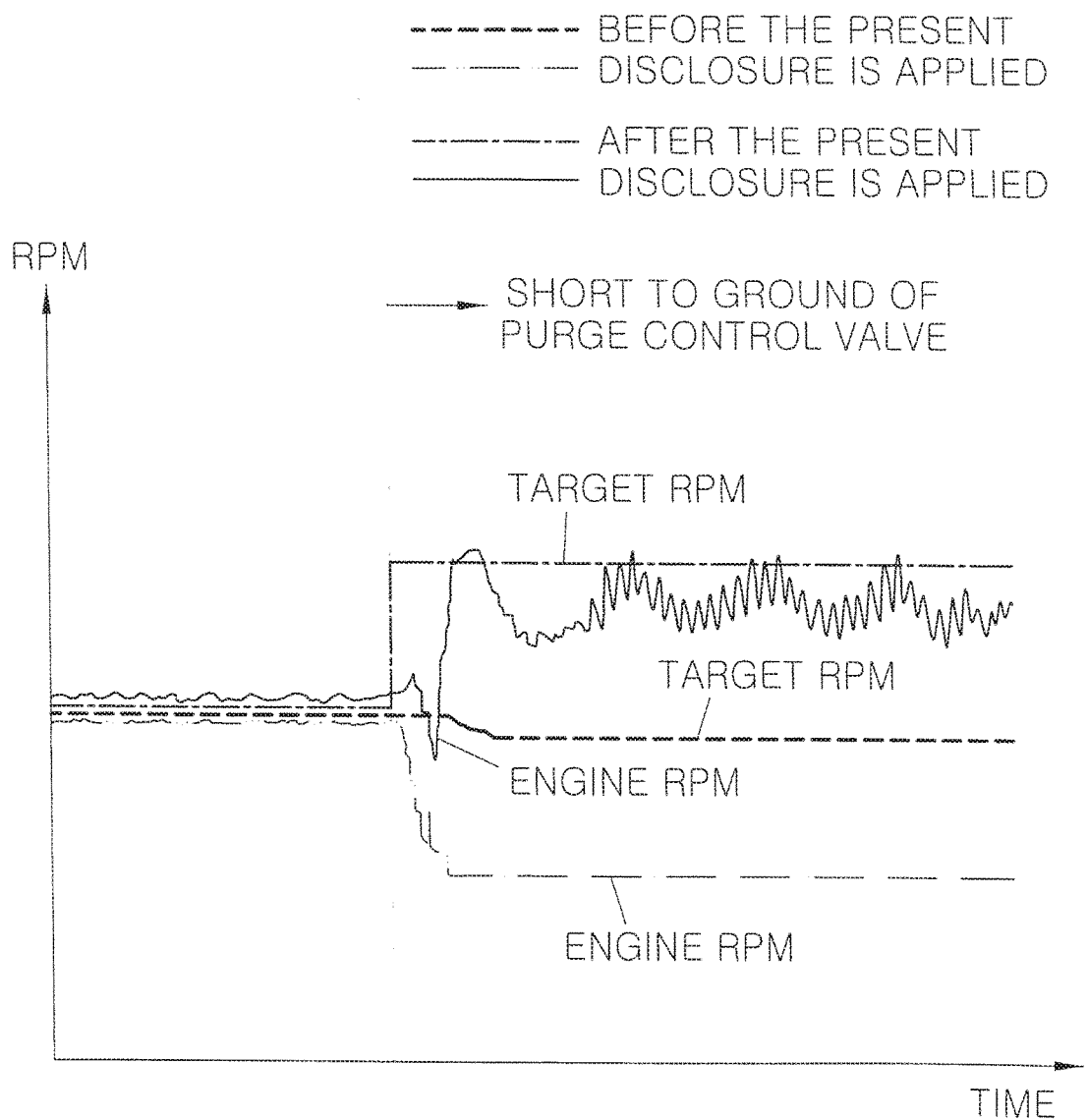
FIG. 4 is a graph showing an engine RPM variation according to an exemplary embodiment of the present disclosure when a purge control valve is short-circuited.

FIG. 4 is a graph showing an engine RPM variation according to an exemplary embodiment of the present disclosure when a purge control valve is short-circuited. Referring to FIG. 4, before the present disclosure is applied, since the target RPM is set to be equal to the prior engine RPM even when the purge control valve becomes short to ground, the engine RPM may drop to equal to or less than an idle RPM due to rich fuel such that the engine may stall.

After the present disclosure is applied, since the target RPM of the engine is controlled to be increased above 1,200 rpm when the purge control valve becomes short to ground, aspects of the present disclosure are able to prevent engine stall in which the engine RPM is dropped to be equal to or less than the idle RPM, even if the engine RPM drops. The exemplary embodiment of the present disclosure discloses to control the target RPM to be increased above 1200 rpm, but it may be variably set according to a vehicle or a designer and it is to be understood that it is not limited to a specific value.

Meanwhile, the control portion 100 may set the present engine RPM as the target RPM when it is determined in the determining step S20 that the fuel that has flowed into the engine 130 is normal S40.

That is, the control portion 100 controls the target RPM to be increased only when the rich fuel has flowed into the engine 130 even though the purge control valve 110 becomes short to ground, thereby minimizing the need for a driver to control the engine RPM to be increased.

Furthermore, the control portion 100 may implement the detecting step S10 only when the engine driving time is longer than the predetermined set-up time before the detecting step S10. This is for the present control not to be implemented in a state that the engine starts to be unstable, and to prevent the phenomenon that the control portion 100 incorrectly detects the purge control valve 110 as short to ground state and thus controls the engine RPM to be increased from occurring.

The control portion may be an engine control unit (ECU). According to the method for preventing engine stall of a vehicle configured as described above, when the purge control valve is connected to a ground to be short to ground, it is able to prevent engine stall due to the short to ground of the purge control valve by controlling an engine RPM to be increased depending on an air/fuel ratio.

Furthermore, when the air/fuel ratio is normal, the engine RPM is not controlled to be increased, thereby minimizing inconvenience due to a target RPM increase.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A method for preventing engine stall of a vehicle comprising:
   detecting, by a control portion, whether a purge control valve becomes short to ground or not;
   determining, by the control portion, how rich a fuel is that has flowed into the engine using an oxygen sensor when it is determined that the purge control valve becomes short to ground in the detecting step; and
   controlling, by the control portion, a target RPM of the engine to be increased when it is determined that the fuel is rich in the determining step.

2. The method for preventing engine stall of a vehicle of claim 1, wherein the detecting step further comprises:
   confirming whether the control portion transmits a driving signal to the purge control valve;
   comparing, by the control portion, a measurement voltage at the purge control valve with a predetermined set-up voltage when it is determined that the control portion does not transmit the driving signal to the purge control valve in the confirming step; and
   deciding, by the control portion, that the short to ground has occurred at the purge control valve when it is determined that the measurement voltage is less than the predetermined set-up voltage in the comparing step.

3. The method for preventing engine stall of a vehicle of claim 1, wherein the control portion implements the detecting step only when an engine driving time is longer than a predetermined set-up time before the detecting step.

4. The method for preventing engine stall of a vehicle of claim 1, further comprising a step of setting, by the control portion, a present engine RPM as the target RPM when it is determined in the determining step that the fuel that has flowed into the engine is normal.

* * * * *